United States Patent Office 2,941,393
Patented June 21, 1960

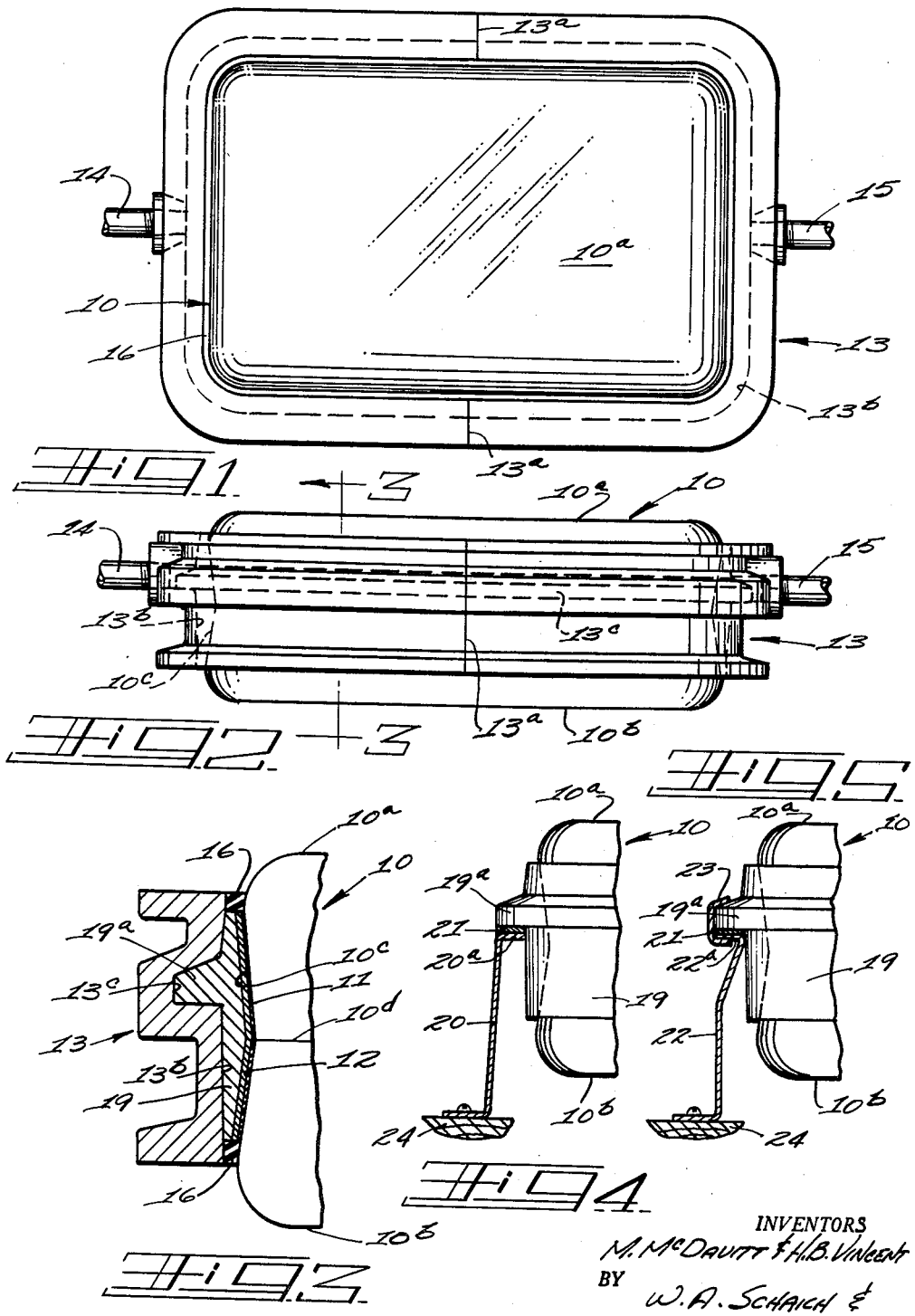

2,941,393

BANDED HOLLOW GLASS STRUCTURAL UNIT

Murray McDavitt and Harvard B. Vincent, Toledo, Ohio, assignors to Owens-Illinois Glass Company, a corporation of Ohio Filed Dec. 7, 1956, Ser. No. 627,047

3 Claims. (Cl. 72—41)

This invention relates to hollow glass structural units such as building blocks or domes which are currently used in or contemplated for use in constructing walls, skylights, partitions, and/or other parts of buildings.

Glass blocks, which are usually of rectangular form, are customarily laid in mortar with each block having a surrounding coating of coarse granular material firmly bonded to the glass. This roughened surface material facilitates bonding the glass blocks with mortar when the blocks are laid in any normal manner wtih a layer of mortar interposed between their mortar-bearing side surfaces. Heretofore, only an extremely thin annular layer of organic plastic material has been initially employed to bond the granular material to the side surfaces of the blocks. The granular material has been applied solely to improve the bonding of the mortar to the glass and to prevent opening and subsequent leakage at the sealed interfaces under service conditions.

Where the blocks have been individually banded with layers of plastic and rough granular materials solely for the purpose of facilitating the bonding between glass and mortar, erection of the blocks into durable structures cannot be conveniently accomplished in all cases such as skylights. The amount of hand labor involved in mounting the blocks utilizing mortar as well as inherent difficulties attendant to their installation in skylighting arrangement thereby necessitate that other retention means be furnished for their economical and expedient mounting in various structural relationshisps. This is true whether the blocks or domes be mounted singly or in combined units such as glass block panels.

Accordingly, it is an object of this invention to provide a hollow glass article for building purposes having a surrounding plastic band adherently bonded to the glass for retention of said article in structural relationship.

Another object of this invention is to provide a hollow glass building block or dome-like structure for mounting in a building which structure has an integrally-attached, impervious, plastic ring or bracket surrounding its side surfaces for its permanent restraint in installed relationship.

Still another object of this invention is to provide as a new article of manufacture a hollow glass building block or dome having an impervious plastic band surrounding its side surfaces which band is contoured to durably restrain the glass block or dome in weather-tight relationship throughout an extensive range of atmospheric conditions.

Still another object of this invention is to provide a method of forming an integrally-bonded, laminated plastic band surrounding the lateral side surfaces of a hollow glass dome-like structure to constitute an attachment annulus therearound for its detachable mounting in an extremely durable and weatherproof manner in a building structure.

The specific nature of this invention, as well as other objects and advantages thereof, will become apparent to those skilled in the art from the following detailed description, taken in conjunction with the annexed sheet of drawings on which, by way of preferred example only, are illustrated the preferred embodiments of this invention.

On the accompanying drawings:

Fig. 1 is a top plan view of a glass building block and surrounding mold in accordance with the present invention.

Fig. 2 is a side elevational view of the glass building block and mold with the mold interior shown in broken lines.

Fig. 3 is an enlarged vertical sectional view of one portion of the glass building block and mold taken along the line 3—3 of Fig. 2.

Fig. 4 is a fragmentary side elevational view of the banded block in installed arrangement.

Fig. 5 is a view similar to Fig. 4 of a modification of the above arrangement.

While this invention will be described as specifically applied to the manufacture of a glass building block having a dome-like construction with relatively smooth viewing and side surfaces, it will be apparent to those skilled in the art that the principles of the invention are equally applicable to the manufacture of any type of hollow glass building unit for structural purposes formed by the assembly of two or more prefabricated glass parts which are unitedly joined.

A preferred embodiment of the present invention consists of a hollow glass dome or building block 10 having relatively flat viewing panels 10a and 10b. Glass block 10 is normally formed of two similarly shaped halves which are centrally joined by fusion of their complemental annular flanges along the planar line 10d into integrally united side surfaces 10c. Side surfaces 10c may be either relatively smooth or formed with a series of small annular flanges for reinforcement of the block.

Block side surfaces 10c in accordance with the present invention are initially coated with a thin annular layer 11 of glass-bondable, metal-organic containing material such as tetrabutyl titanate, Volan, or a selected silicone resin. Annular layer 11 extends fully co-extensive with side surfaces 10c and may be applied by brushing, spraying or by any other expedient method to the exterior glass side surfaces. The material which comprises annular layer 11 is frequently one containing a solvent, which, when removed by the moderate application of heat for example, leaves its reactive, metal-organic constituent firmly and durably bonded to the glass.

Another slightly thicker annular layer 12 of a resilient organic polymer is applied over layer 11 and is selected to include an organic material which will chemically bond with first-applied thin layer 11. Layer 12 may be composed of a synthetic elastomer to furnish resilient and slightly deformable characteristics to this intermediate layer. The elastomeric material may consist of polyurethane resin, polyvinyl resin, or neoprene. The selected material, which may be classified in any one of these groups although a polyurethane resin or neoprene are preferred, may be applied in an unreacted condition over layer 11 and reacted in place with a suitable catalyst and/or a plasticizer to complete its reaction into a fully polymerized condition. The first two layers 11 and 12 contiguous with glass side surfaces 10c are applied to glass block 10 while it is separated from and prior to its being mounted in mold 13.

Mold 13 is fabricated of metal and is separable along a transverse center line 13a. Mold 13 has an overall shape similar to and adaptable to surround the side surface 10c of glass block 10 a uniform distance therefrom. Mold 13 is generally rectangular in shape with interior surfaces 13b having dimensions greater than the longitudinal dimensions of similar viewing panels 10a and 10b and a thickness less than side surfaces 10c. Thus mold 13 is able to encompass the major central portions of side surfaces 10c with an open annulus therebetween.

An inlet line 14 and an outlet line 15 are attached to and extend through opposite sidewalls of mold 13 coincidental with its longitudinal axis. The interior of mold 13 has relatively smooth vertical molding surfaces 13b and an enlarged portion 13c located in its upper region which is adaptable to forming an annular flange.

Mold 13 is placed around block 10 with its center horizontal plane coincidental with block sealing line 10d. Two bands 16 of elastic material such as synthetic rubber are fitted into the annular areas at the upper and lower limits of the mold to contact both mold 13 and glass side surfaces 10c. Thus the open annulus between mold 13 and surrounding annular layers 11 and 12 on glass surfaces 10c is completely enclosed except for inlet and outlet lines 14 and 15.

After mold 13 is properly placed around block 10, an intermixed plastic material is either forced into the open annulus under pressure or drawn therein under vacuum to form an outermost plastic band 19 bonded to intermediate plastic layer 12. The inlet and outlet lines 14 and 15 may be arranged in vertical alignment during the molding operation with inlet line 14 below and outlet line 15 above, for example, to allow the plastic material to flow or be drawn upwardly into the open annulus.

The plastic material is principally composed of a thermosetting resin such as an epoxy resin, polyester resin or phenolic resin which upon reaction will bond to the resilient annular layer 12 and be converted into a rigid annular band 19 for support of glass block 10. The widest portion of interior molding surface 13c thus facilitates the molding of a durable annular flange 19a extending radially from the upper region of band 19.

The plastic material which comprises the major reactive organic constituent of band 19 is preferably an epoxy resin which has coefficients of thermal expansion and contraction about 3 to 5 times those of the glass. The laminated nature of the band is suitable for withstanding severe temperature variations without damage to either the plastic band or the glass. In nothern climes, where the temperature differences throughout the season may vary from −40° to +110° F., both the laminated plastic band composed of layers 11, 12 and 19 and glass block 10 must be capable of withstanding both these temperature and atmospheric pressure variations without developing cracks which would allow the entrance of damaging elements such as water. The resin selected for outermost band 19 may contain a mineral filler such as finely-divided calcium carbonate, silica or other material to give body, strength and reduced coefficient of expansion and contraction to the reacted polymerized material. The intermixed material for injection into the mold also contains a suitable catalyst and/or plasticizer to obtain complete polymerization of the resin.

After the mold has been completely filled with the intermixed plastic material to form annular band 19 and has been permitted to remain in the mold for a sufficient interim to obtain complete reaction thereof, mold 13 is separated along the line 13a and removed from glass block 10 leaving the laminated plastic ring composed of layers 11, 12, and 19 surrounding glass block 10. The two elastic bands 16 which are employed to seal the mold may be removed and one or both edges of the plastic material may be coated with a thin layer of caulking or elastomer material such as Thiokol rubber applied to the upper and/or lower extremities of the laminated plastic band to further insure a weather-tight bond between the glass and plastic layers.

Glass building block 10 with its surrounding plastic band 19 may be mounted in skylighting arrangement as shown in Fig. 4 with an upright metal curb 20 surrounding an opening in roof 24. Annular curb 20 has an upper flange 20a which provides an underlying supporting surface for annular flange 19a of plastic band 19. An annular gasket 21 of impervious weatherproof material such as neoprene rubber may be interposed between annular flange 19a and curb support flange 20a.

In another modification of the mounting arrangement of banded glass block 10, an annular curb 22 may be mounted on roof 24 surrounding a skylighting opening. Curb 22 has an outwardly directed support flange 22a of complemental contour to the annular flange 19a of plastic band 19 for its support in underlying relationship. A similar gasket of weatherproof material 21 may be employed between flange 19a and support flange 22a. An annular metallic ring 23 having a U-shaped cross-section may be employed to enclose the radial extremities of annular flange 19a, support flange 22a and gasket material 21.

In the above described invention the term "glass building block" has been employed to describe a glass structural unit although the term "glass dome" or "glass skylighting element" may be also employed to describe the glass element. It is not the purpose of this invention to limit its scope to a glass block alone but to include all other forms of glass building units which are employed in construction.

Various modifications may be resorted to within the spirit and scope of the appended claims.

We claim:

1. As a new article of manufacture, a hollow sealed glass structural unit having twin light-transmitting panels surrounded by integrally joined annular side surfaces, said side surfaces provided with a continuous annular coating comprised of a thin layer of glass-bondable, metal-organic containing material applied directly to the glass, a shaped annular member of substantial thickness comprised of an essentially rigid thermosetting organic resin surrounding said side surfaces, and an intermediate essentially resilient cushioning layer comprised of a polymerized organic material joining the said coating and said shaped annular member, said shaped annular member being essentially opaque and having a radial flange projecting from said side surfaces adapted to support said structural unit in weather-tight relation.

2. The hollow sealed glass structural unit in accordance with claim 1, wherein said shaped annular member is of considerably greater cross-sectional thickness than said coating and cushioning layers and is comprised essentially of an epoxy resin.

3. The hollow sealed glass structural unit in accordance with claim 1, wherein said intermediate essentially resilient cushioning layer consists of a polymerized polyurethane resin.

References Cited in the file of this patent

UNITED STATES PATENTS

| | | |
|---|---|---|
| 2,297,309 | Limbert | Sept. 29, 1942 |
| 2,318,362 | Boeglen et al. | May 4, 1943 |
| 2,333,723 | Jordan | Nov. 9, 1943 |
| 2,397,242 | Chubb et al. | Mar. 26, 1946 |
| 2,685,107 | Schultz | Aug. 3, 1954 |
| 2,703,486 | Ford | Mar. 8, 1955 |
| 2,714,816 | Pennell | Aug. 9, 1955 |
| 2,754,237 | Brooks | July 10, 1956 |
| 2,776,910 | Erickson et al. | Jan. 8, 1957 |

FOREIGN PATENTS

| | | |
|---|---|---|
| 489,803 | Canada | Jan. 20, 1953 |